May 26, 1959
R. H. MUNSON ET AL
2,888,631
CONVERTER
Filed April 4, 1955
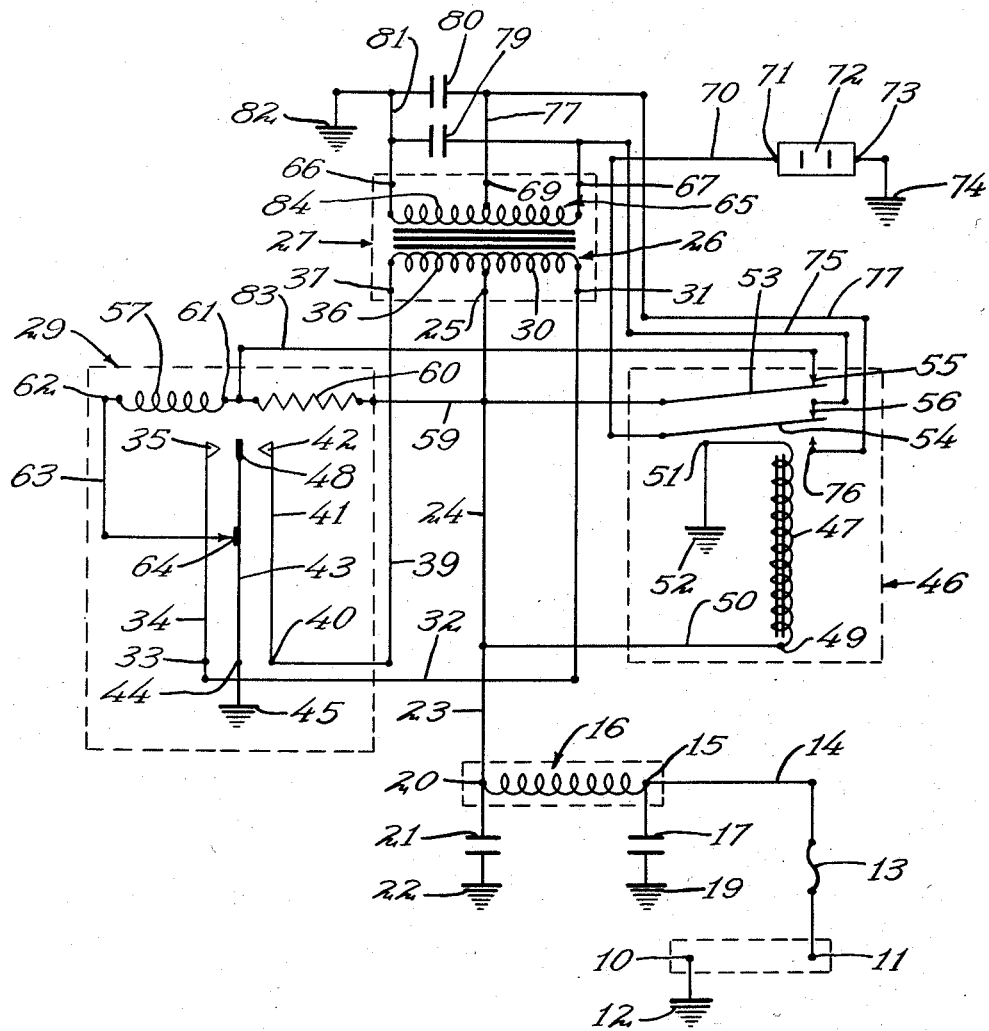
INVENTOR
Theodore M. Munson Jr.
Ralph H. Munson
BY Robert M. Dunning
ATTORNEY

United States Patent Office 2,888,631
Patented May 26, 1959

2,888,631

CONVERTER

Ralph H. Munson and Theodore M. Munson, Jr., St. Paul, Minn., assignors to Terado Company, St. Paul, Minn., a partnership Application April 4, 1955, Serial No. 498,822

2 Claims. (Cl. 321—49)

This invention relates to an improvement in converters and deals particularly with an apparatus for delivering an alternating current supply of predetermined voltage from a direct current supply source of one of two predetermined voltages.

For numerous years most passenger automobiles have been produced using a six volt battery for operating the starter motor, lights, and other equipment. Recently certain manufacturers have started to use twelve volt batteries. This difference in battery voltage has caused certain difficulties to attachments used on the vehicles. For example, converters have been produced in volume for converting the six volt direct current to one hundred twenty volt, sixty cycle alternating current for the purpose of operating electric shavers, dictating machines, phonographs, radios and other appliances. As a result the converters have been designed for operation either from a six volt D.C. supply or a twelve volt D.C. supply. Furthermore, in some instances, the structure has been made to operate selectively from a six volt supply or a twelve volt supply.

This has resulted in certain definite difficulties. In many instances the automobile owner is not familiar with the particular type of battery used in his car and, as a result, has often obtained a converter designed for use with a six volt battery and has used this converter in an automobile having a twelve volt system. The converse is also true. Furthermore, many automobile owners will move a converter from one car to another without realizing that the supply voltage is different. Destruction or serious injury to the equipment may result.

An object of the present invention resides in the avoiding of previous difficulties by producing a converter which may be used selectively on either of the two systems without making any adjustment or change in the equipment or structure. In other words, the converter may be removed from a vehicle having a six volt circuit and installed the converter in another vehicle having a twelve volt system and vice versa without creating any chances of injury to the equipment or to the equipment used with the converter.

A feature of the present invention resides in the provision of a converter which may be used with either of two direct current voltages of predetermined voltage to supply alternating current of given voltage and frequency. At the present time the equipment is designed for use with either six or twelve volt batteries to supply an alternating current of approximately one hundred ten volts at sixty cycles per second. Obviously, however, the apparatus could be designed for use with direct current voltages of any two predetermined amplitudes to produce an alternating current of a predetermined voltage and frequency.

A feature of the present invention resides in the use of a relay for controlling the high voltage side of a transformer. The relay is so constructed that its armature will not be effected by the lower of the two direct current supplies, but will be effected by the higher of the two direct current supplies. As a result, regardless of which direct current supply source is used, the alternating output voltage may remain substantially constant.

These and other objects and novel features of my invention will be more clearly and fully set forth in the following specification and claims:

The drawing is a diagrammatic view of the wiring system of a typical unit.

The converter includes input terminals 10 and 11. For the purpose of convenience, one of the terminals such as 10 is shown grounded at 12. The other terminal 11 is connected through a fuse 13 to a conductor 14 leading to one terminal 15 of a choke coil 16. This choke coil 16 is used in its normal way to smooth out variations in the current and the terminal 15 is connected to a condenser 17, the other terminal of which is grounded at 19.

The second choke coil terminal 20 is also connected to a condenser 21, the second terminal of which is grounded at 22. The terminal 20 is also connected by conductors 23 and 24 to their intermediate tap 25 of the low voltage winding 26 of a transformer 27.

A vibrator indicated in general by the numeral 29, is connected to the transformer winding 26 to be energized thereby. The winding 26 includes one section 30 which has a terminal 31 connected by a conductor 32 to a fixed contact terminal 33 of the vibrator 29. The terminal 33 is connected to the contact blade 34 of the vibrator having a contact point 35.

The coil 26 also includes a section 36 on the side of the tap 25 opposite the coil section 30 and the terminal 37 of coil section 36 is connected by a conductor 39 to a stationary vibrator contact terminal 40. This terminal 40 is connected with the contact blade 41 having a contact point 42 in opposed relation to the contact point 35. The vibrating reed 43 of the vibrator 29 has its terminal 44 grounded at 45. The reed 43 includes a contact point 48 which vibrates alternately into contact first with the contact 42 and then when the contact 35 by reason of the excitation of a driver coil and repelling action of the current produced therein, providing current pulsations in the manner as hereinafter described.

A voltage relay 46 is provided in the circuit including a relay coil 47 having one terminal 49 connected by the conductor 50 to the condenser side 21 of the low voltage circut through conductor 23 connected at contact 20 to choke coil 16, conductor 14 and fuse 13 to terminal 11. The second terminal 51 of the relay coil 47 is grounded as indicated at 52, thus completing the relay circuit and energizing the coil 47 whenever the low voltage circuit is closed. The coil 47 is so produced that the lower of the two selective direct current supply voltages will not energize the coil sufficiently to operate the relay armatures. This coil 47 is, however, so constructed that when the larger of the two selected low voltage direct current supplies are connected between the terminals 10 and 11, the relay armatures 53 and 54 will be attracted to break two circuits and to close another. The armatures 53 and 54 are normally biased away from the core of the relay coil 47 forming contact with contact terminals 55 and 56, respectively. The armature 53 controls the flow of current to the vibrator driver coil 57 which acts to vibrate the reed 43 between the fixed contacts 35 and 42.

The armature 53 is connected by a conductor 59 which leads through a resistor 60 connected to the terminal 61 of the driver coil 57. The other coil terminal 62 is connected by the conductor 63 to the make and break contact point 64 against which the reed 43 normally makes contact when in vertical position, as illustrated. Energization of the driver coil 57 causes contact 64 to repell the reed 43 away from the fixed contact 35 and against the fixed contact 42. Simultaneously, however, the circuit to the driver coil 57 is broken and, after contact with the fixed contact 42, the reed 43 swings back past its starting position to make contact at 35.

This operation of the vibrator 29 acts to alternately energize the section 30 of the low voltage coil 26 and then the section 36 of this low voltage coil. This produces an alternating current in the high voltage transformer coil 65 which occurs at a frequency determined by the construction of the vibrator and its contacts. The amplitude of voltage produced by the coil 65 is dependent upon the turns ratio of the coils 26 and 65. Thus the voltage produced may be regulated through the use of suitable transformer taps on the coil 65. For the purpose of illustration, it may be considered that a current of six volts applied to the coil 26 will produce a voltage of one hundred and ten volts between the terminals 66 and 67 of the coil 65 and that a voltage of 12 volts applied to the winding 26 will create a voltage of two hundred and twenty between the terminals 66 and 67. An intermediate tap 69 is provided on the coil 65 at such a point that one hundred and ten volts may be produced by the connected portion of the coil 65 when twelve volts are applied to the coil 26.

A relay circuit is provided for determining whether or not the entire coil 65 is to be directed to the output outlet or whether the voltage from only a section of the coil 65 will be directed thereto. The relay armature 54 is connected by a conductor 70 to one terminal 71 of the output outlet 72, the other terminal 73 of which is grounded at 74. The terminal 67 of the transformer coil 65 is connected by a conductor 75 to the terminal 56 of the relay 46. The armature 54, when energized, may be drawn against a second contact 76 which is connected by a conductor 77 to the intermediate tap 69 of the transformer. A buffer condenser 79 is interposed between the terminals 66 and 67 of the transformer coil 65 and a second buffer condenser 80 is connected between the intermediate tap 69 of this transformer coil and the grounded terminal 66, this terminal being grounded by the conductors 81 and 82. A conductor 83 is connected to the vibrator terminal 61 leading to the relay armature contact 55. The conductor 59 is connected to the conductor 23 or to the ungrounded side of the direct current circuit. Accordingly, when the relay 46 is not energized, a circuit is closed from the ungrounded side of the line through choke coil 16 and conductors 23, 24 and 59 to the armature 53. The current may flow through this armature and contact 55 to conductor 83 leading to the driver coil 57 to actuate the reed 43, the circuit being completed through the make and break contact 64 and reed 43 to ground at 45. When the relay 46 is energized, the contact between the armature 53 and the contact 55 is broken and the ungrounded side of the direct current circuit is connected through the choke coil 16 and the conductors 23, 24 and 59 to the vibrator coil 57 through the resistor 60. In other words, when the relay is not energized, the full direct current voltage is supplied to the vibrator coil 57. When the relay is energized, the direct current must flow through the resistor 60 which cuts down the voltage to a proper degree to prevent damage to the driver coil 57 and contact points of the vibrator reed 43.

Having now described the complete circuit, the operation thereof may be simply described as follows.

When the terminals 10 and 11 are connected to the terminals of a low voltage direct current supply such as, for example, a six volt battery, a circuit is closed through the coil of the relay 46 which is insufficient to attract the armatures of the relay, so that these armatures remain biased toward the fixed contacts 55 and 56. A circuit is also closed directly to the driver coil 57 bypassing the resistor 60. Operation of the driver coil 57 acts to energize first one side of the low voltage coil 26 and then the other side thereof. This creates alternating current in the coil 65 of a predetermined voltage and frequency. For example, one hundred and ten volts may be developed between the terminals 66 and 67. The terminal 66 is connected to the output outlet 72 through ground and the other terminal 67 is connected to the second output terminal 71 through the conductor 75, contact 56, relay armature 54 and conductor 70.

If the six volt supply device is removed and a twelve volt battery is attached between the terminals 10 and 11, the increased voltage will close the circuit from terminal 11 through the fuse and the choke coil 16 and conductors 23 and 50 to energize the relay coil 47, the other relay coil terminal and other battery terminal being grounded. Energization of the coil 47 by the larger D.C. source moves the armature 53 away from its contact 55 and moves the armature 54 from the contact 56 to the contact 76. Movement of the armature 53 acts to open the line 83 short circuiting the resistor 60 and the current energizing the driver coil 57 is suitable reduced by the resistor 60. At the same time engagement of the armature 54 with the contact 76 acts to open the circuit through the entire coil 65 and to close the circuit through section 84 of the coil 65. The coil section 84 is properly proportioned to provide the same output voltage with the larger D.C. source, as was previously obtained through connection of the entire coil 65.

It will be seen that by this arrangement it is possible to produce a uniform alternating current output from different direct current input sources. The operation is entirely automatic. As a result, the damage to the apparatus through supplying excessive voltage to the vibrator or producing excessive voltage at the ouput outlet is eliminated.

In accordance with the patent statutes, we have described the principles of construction and operation of our converters, and while we have endeavored to set forth the best embodiment thereof, we desire to have it understood that obvious changes may be made within the scope of the following claims without departing from the spirit of our invention.

We claim:

1. A converter for producing a relatively alternating current of relatively high uniform voltage selectively from either of two known direct current sources of relatively lower voltage, the converter including a pair of input conductors adapted for connection with either of the direct current sources, a transformer including a primary coil having an intermediate tap connected to one of said input conductors, a vibrator including a reed connected to the other of said input conductors, a pair of contacts with which said reed is alternately connected, said contacts being connected to opposite ends of said coil, a driving coil connected to said one input conductor and intermittently engaging said reed to vibrate the same, a relay having an actuating coil actuated by the higher of said direct current sources but not actuated by the lower of said direct current sources, a secondary coil in said transformer having an intermediate tap, said relay including an armature selectively engageable with a pair of relay contacts, one of which is normally closed and the other of which is normally open and is closed upon actuation of said relay, said normally closed relay contact being connected to one end of said secondary coil and said normally open contact being connected to said intermediate tap on said secondary coil, means connecting the other end of the secondary coil to the other said input conductor, an output socket having one terminal connected to said relay armature and having a second terminal connected to said other input conductor, said intermediate taps and said coils being proportioned to provide substantially the same alternating current voltage between said socket terminals when either of said direct current sources is connected to said input conductors.

2. The structure of claim 1 and including a resistor connected in series between said one input conductor and said driving coil, a second armature forming a part of said relay and connected to said one input conductor, a relay contact with which said armature is normally engaged when said relay is not actuated, and a shunt connector from said last named relay contact and said driving coil shorting out said resistor when said relay is not activated.

References Cited in the file of this patent

UNITED STATES PATENTS 2,703,376    Board  ------------------  Mar. 1, 1955